United States Patent [19]

Kurematsu et al.

[11] Patent Number: 5,580,142
[45] Date of Patent: Dec. 3, 1996

[54] IMAGE FORMING APPARATUS AND PROJECTOR USING THE SAME

[75] Inventors: Katsumi Kurematsu, Kawasaki; Tsunefumi Tanaka; Takeshi Abe, both of Yokohama, all of Japan

[73] Assignee: Canon Kabushiki Kaisha, Tokyo, Japan

[21] Appl. No.: 454,411

[22] Filed: May 30, 1995

Related U.S. Application Data

[63] Continuation of Ser. No. 57,085, May 3, 1993, abandoned.

[30] Foreign Application Priority Data

May 6, 1992 [JP] Japan .................................. 4-113614

[51] Int. Cl.[6] ...................................................... G03B 21/28
[52] U.S. Cl. ............................. 353/31; 353/98; 353/102
[58] Field of Search ............................... 353/31, 33, 34, 353/37, 20, 81, 84, 94, 98, 102; 359/40, 48, 49, 63, 64; 348/750, 766, 776–780, 810; 362/296, 307, 308, 341

[56] References Cited

U.S. PATENT DOCUMENTS

| | | | |
|---|---|---|---|
| 4,145,712 | 3/1979 | Spooner et al. | 358/60 |
| 4,912,614 | 3/1990 | Goldenberg | 353/31 |
| 4,969,730 | 11/1990 | van den Brandt | 353/31 |
| 4,971,436 | 11/1990 | Aoki et al. | 353/31 |
| 5,042,921 | 8/1991 | Sato et al. | 359/49 |
| 5,135,300 | 8/1992 | Toide et al. | 353/94 |
| 5,193,015 | 3/1993 | Sharks | 353/84 |
| 5,255,082 | 10/1993 | Tamada | 353/31 |
| 5,394,204 | 2/1995 | Shigeta et al. | 353/31 |

FOREIGN PATENT DOCUMENTS

| | | | |
|---|---|---|---|
| WO-A-8906417 | 7/1989 | European Pat. Off. | |
| 61-35481 | 2/1986 | Japan . | |
| 0262822 | 11/1987 | Japan | 359/48 |
| 04288535 | 10/1992 | Japan | 353/98 |
| 5313114 | 11/1993 | Japan | 359/40 |

*Primary Examiner*—William C. Dowling
*Attorney, Agent, or Firm*—Morgan & Finnegan LLP

[57] ABSTRACT

An image forming apparatus of this invention relates to an image forming apparatus for forming a color image and, more particularly, to a projector using the image forming apparatus. The image forming apparatus includes a color light illuminating system having first and second light sources for emitting different color light components, and first, second, and third imaging units or liquid crystal light valves for modulating the color light components to form color images. The first light source is a light source for mainly emitting two color components corresponding to the images formed by the first and second imaging units, and the second light source is a color light source for mainly emitting a color component corresponding to the image formed by the third imaging unit.

25 Claims, 14 Drawing Sheets ies of the present invention, reference will be made to the

IMAGE FORMING APPARATUS AND PROJECTOR USING THE SAME

This is a continuation of application Ser. No. 08/057,085, filed on May 3, 1993, now abandoned.

BACKGROUND OF THE INVENTION

1. Field of the Invention

The present invention relates to an image forming apparatus for forming a color image and, more particular, a projector using the same.

2. Related Background Art

A conventional image forming apparatus is exemplified by a projector shown in FIG. 1.

Light emitted from a light source 30 directly or through a reflector 5 is color-separated into red, green, and blue light components by a dichroic mirror 7 for reflecting the red light component and transmitting the green and blue light components therethrough and a dichroic mirror 8 for reflecting the blue light component and transmitting the green light component therethrough and a total reflection mirror 20. The color-separated light components pass through liquid crystal light valves 1, 2, and 3 and are synthesized through a dichroic mirror 9 for reflecting the blue light component and transmitting the red light component therethrough and a dichroic mirror 10 for reflecting the green light component and transmitting the red and blue light components therethrough. The synthesized light is projected through a projection lens 6.

A metal halide lamp having spectral characteristics in the entire visible light range, as shown in FIG. 2 is used as the light source 30.

In the conventional apparatus, a color-separating optical system is located between the light source and the liquid crystal light valves, and optical paths between the light source and the liquid crystal light valves must have predetermined lengths. Illumination light from the light source cannot be perfect telecentric light and contains convergent and divergent components. For this reason, the illumination light has a considerably large loss by divergence during propagation along the optical paths having the predetermined lengths. In addition, the color-separating optical system causes an increase in the size of the apparatus as a whole, thereby degrading portability of the apparatus.

As one method of solving these conventional problems, there may be proposed a single light valve type liquid crystal projector which has one white light source and one liquid crystal light valve having an RGB mosaic color filter. This arrangement allows formation of a projector by one liquid crystal light valve, and the color-separating optical system and the color-synthesizing optical system can be omitted, thereby realizing a very compact apparatus. However, the following problems are still posed by this apparatus.

As the color filter is generally of an absorption type, the amount of white light passing through the color filter is reduced to about ⅓. For this reason, the transmittance of the liquid crystal light valve is reduced, and hence a sufficiently bright display image cannot be obtained.

SUMMARY OF THE INVENTION

It is an object of the present invention to provide a compact image forming apparatus having a high light utilization efficiency and a high resolving power and a projector using the same.

In order to achieve the above object according to an aspect of the present invention, there is provided an image forming apparatus having a plurality of imaging means for forming color-separated images and color-synthesizing means for synthesizing the image light components from the plurality of imaging means, characterized by comprising a plurality of light sources, wherein the plurality of imaging means are illuminated with different color light components.

According to another aspect of the present invention, there is provided a projector comprising an elliptical reflector and a light source located near one focal point of the elliptical reflector and a projection lens located such that a pupil thereof is located near the other focal point of the elliptical reflector, wherein imaging means is located at a position equidistantly spaced apart from both the focal points, so that non-image light reflected by the imaging means is directed near the light source.

According to still another aspect of the present invention, there is provided a projector having a reflector of a shape having at least one focal point, a light source arranged near the focal point, imaging means for modulating light from the light source to form an image, and a mosaic color filter for color-separating the light incident on the imaging means into red, green, and blue light components in a mosaic distribution, wherein the mosaic color filer comprises an interference filter for transmitting any of the red, green, and blue light components and reflecting remaining color components, and the reflected remaining light components are directed near the light source.

DETAILED DESCRIPTION OF THE PREFERRED EMBODIMENTS

Figure 3:
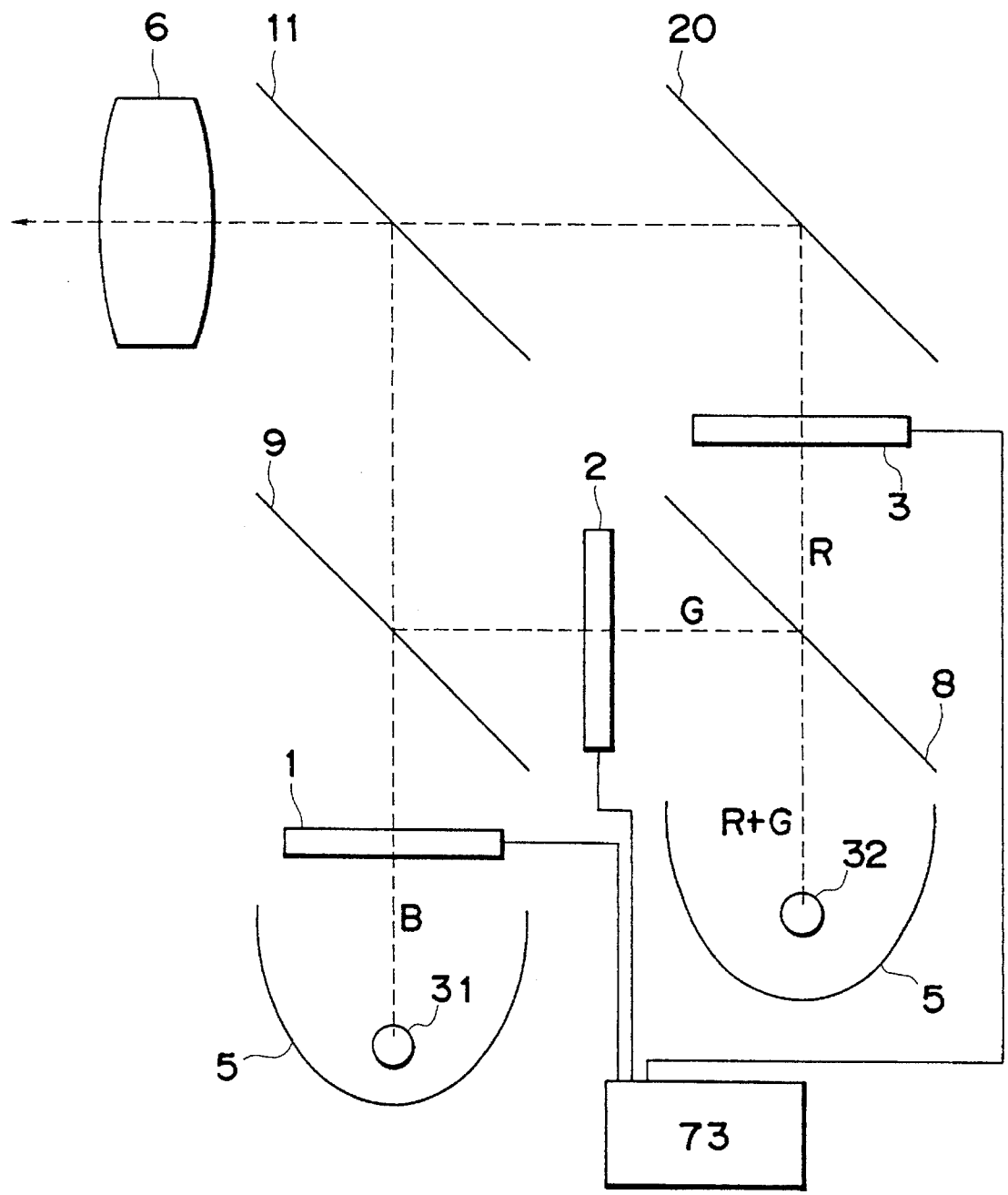
FIG. 3 is a schematic view showing an arrangement of an embodiment of the present invention.
Figure 5:
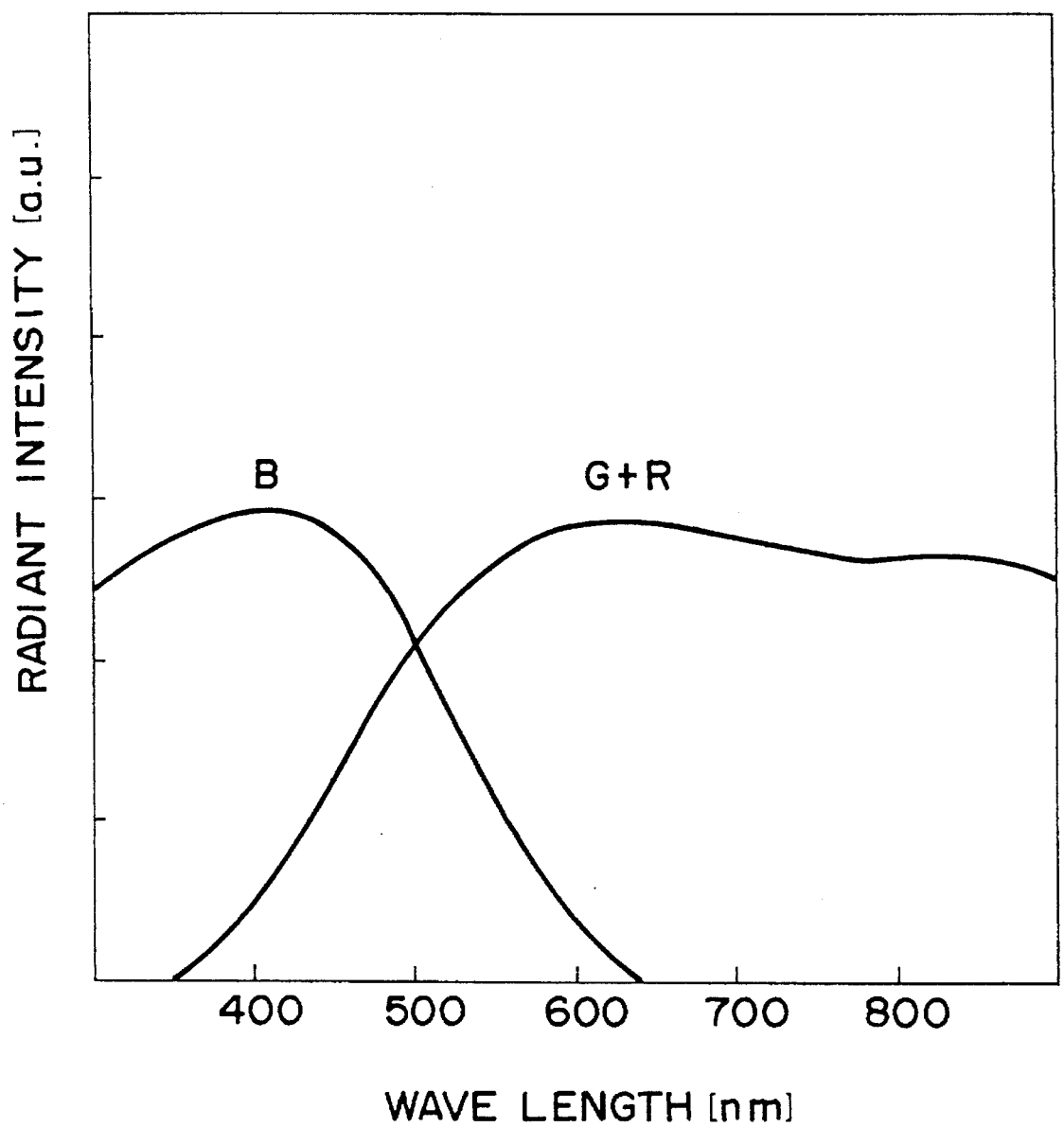
FIG. 5 is a graph showing the spectral characteristics of a color light source used in the embodiments of the present invention.

FIG. 3 is a schematic view showing an arrangement of an embodiment of the present invention. Light valves 1, 2, and 3 as imaging means form color images corresponding to the blue, green, and red light components, respectively. An apparatus in FIG. 3 also includes a projection lens 6, dichroic mirrors 8, 9, and 11, a total reflection mirror 20, and color light sources 31 and 32 having spectral characteristics represented by B and G+R, respectively, as shown in FIG. 5. More specifically, the light source 31 is a blue light source, and the light source 32 is a yellow light source having green and red spectra. These components of the apparatus have a layout, as shown in FIG. 3. The light source 32 may be constituted by green and red light sources which are arranged adjacent to each other.

The blue light source 31 is located immediately behind the liquid crystal light valve 1. For this reason, the length of the illumination optical path can be reduced to ¼ or less of the conventional apparatus shown in FIG. 1. Illumination light emitted from the yellow light source 32 is color-separated into red and green light components by the dichroic mirror 8. The 10 red and green light components are radiated on the liquid crystal light valves 2 and 3, respectively. The length of the optical path can be reduced to about ½ the conventional apparatus shown in FIG. 1 in which light components reach the liquid crystal light valves 2 and 3 through two dichroic mirrors. The loss of the divergent illumination light can be greatly reduced, and a brighter image forming apparatus can be arranged.

Note that combinations of the color filters and a white light source may be used in place of the blue and yellow light sources described above.

After the light components pass through the liquid crystal light valves 1, 2, and 3, they are synthesized again through the total reflection mirror 20, the dichroic mirror 9 for transmitting the blue light component and reflecting the green component, and the dichroic mirror 11 for transmitting the red light component and reflecting the green and blue light components. The synthesized light is projected through the projection lens 6.

In this embodiment, if the dichroic mirrors 8 and 11 are designed to transmit the red light component and reflect the blue and green light components, the dichroic mirrors 8 and 11 can be identical to each other, thus resulting in an economical advantage. At this time, if the dichroic mirrors 8 and 11 are constituted by a single dichroic mirror, the number of optical elements and the number of positioning operations can be reduced.

Man's eye is most sensitive to the green light component among the components in the visible range. On the other hand, when light is obliquely incident on parallel flat plates, as in this embodiment, an astigmatism occurs. Judging from these two factors, it is found that the number of times of passing of the green light component through a dichroic mirror can be reduced to obtain a high resolving power. In this embodiment, since the green light component does not pass through a dichroic mirror, a display image having a high resolving power can be obtained.

Figure 4:
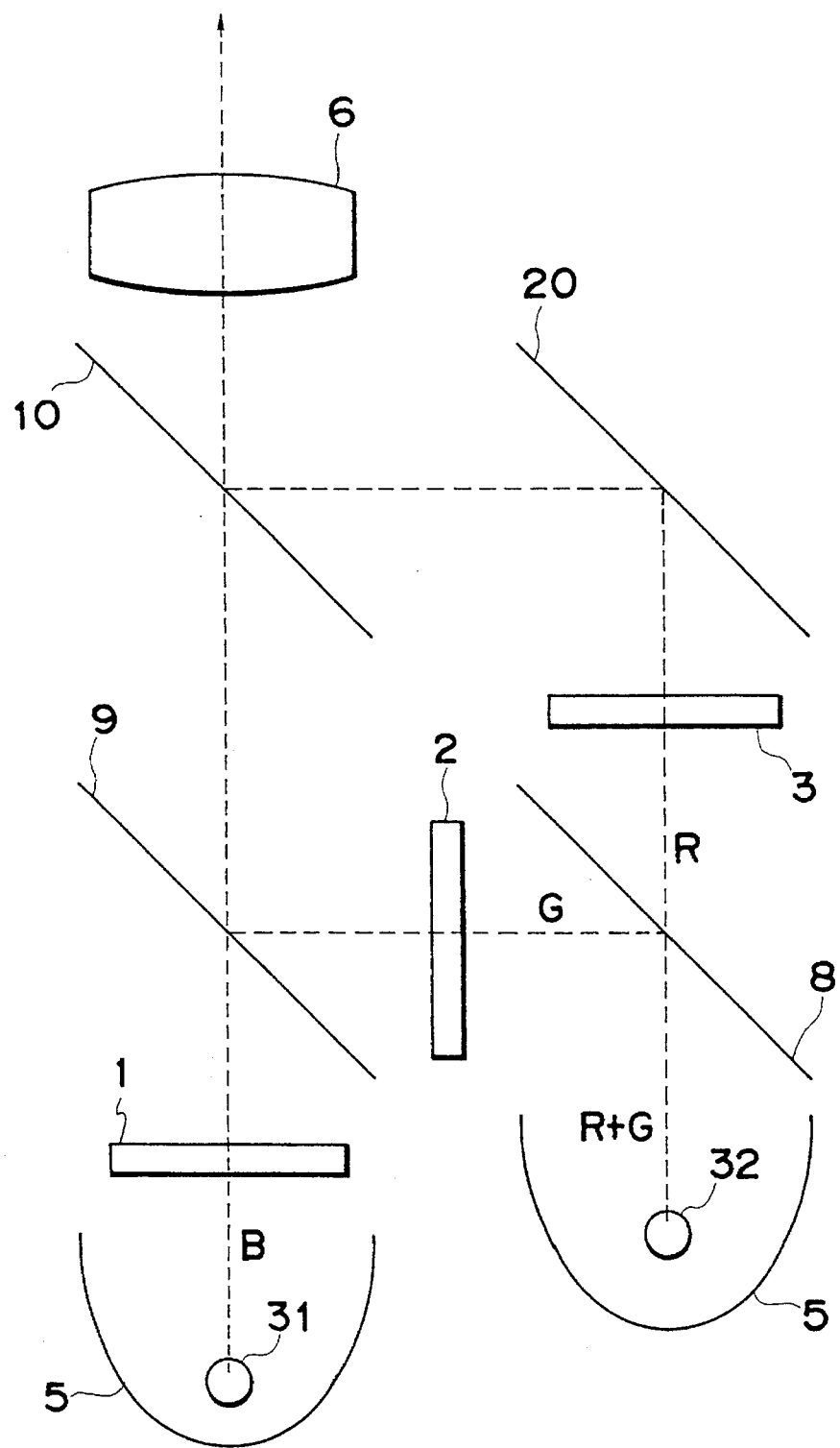
FIG. 4 is a schematic view showing an arrangement of another embodiment of the present invention.

FIG. 4 is a schematic view showing an arrangement of another embodiment according to the present invention. Light valves 1, 2, and 3 as imaging means form color images corresponding to the blue, green, and red light components, respectively. An apparatus in FIG. 4 also includes a projection lens 6, dichroic mirrors 8, 9, and 10, a total reflection mirror 20, and color light sources 31 and 32 having spectral characteristics represented by B and G+R, respectively, as shown in FIG. 5. More specifically, the light source 31 is a blue light source, and the light source 32 is a yellow light source having green and red spectra. These components of the apparatus have a layout, as shown in FIG. 4.

The blue light source 31 is located immediately behind the liquid crystal light valve 1. For this reason, the length of the illumination optical path can be reduced to ¼ or less of the conventional apparatus shown in FIG. 1. Illumination light emitted from the yellow light source 32 is color-separated into red and green light components by the dichroic mirror 8. The red and green light components are radiated on the liquid crystal light valves 2 and 3, respectively. The length of the optical path can be reduced to about ½ the conventional apparatus shown in FIG. 1 in which light components reach the liquid crystal light valves 2 and 3 through two dichroic mirrors. The loss of the divergent illumination light can be greatly reduced, and a brighter image forming apparatus can be arranged.

After the light components pass through the liquid crystal light valves 1, 2, and 3, they are synthesized again through the total reflection mirror 20, the dichroic mirror 9 for transmitting the blue light component and reflecting the green component, and the dichroic mirror 10 for reflecting the red light component and transmitting the green and blue light components. The synthesized light is projected through the projection lens 6.

With this arrangement, the direction of a projection image can be shifted from that of the embodiment of FIG. 3 by 90°.

Figure 1:
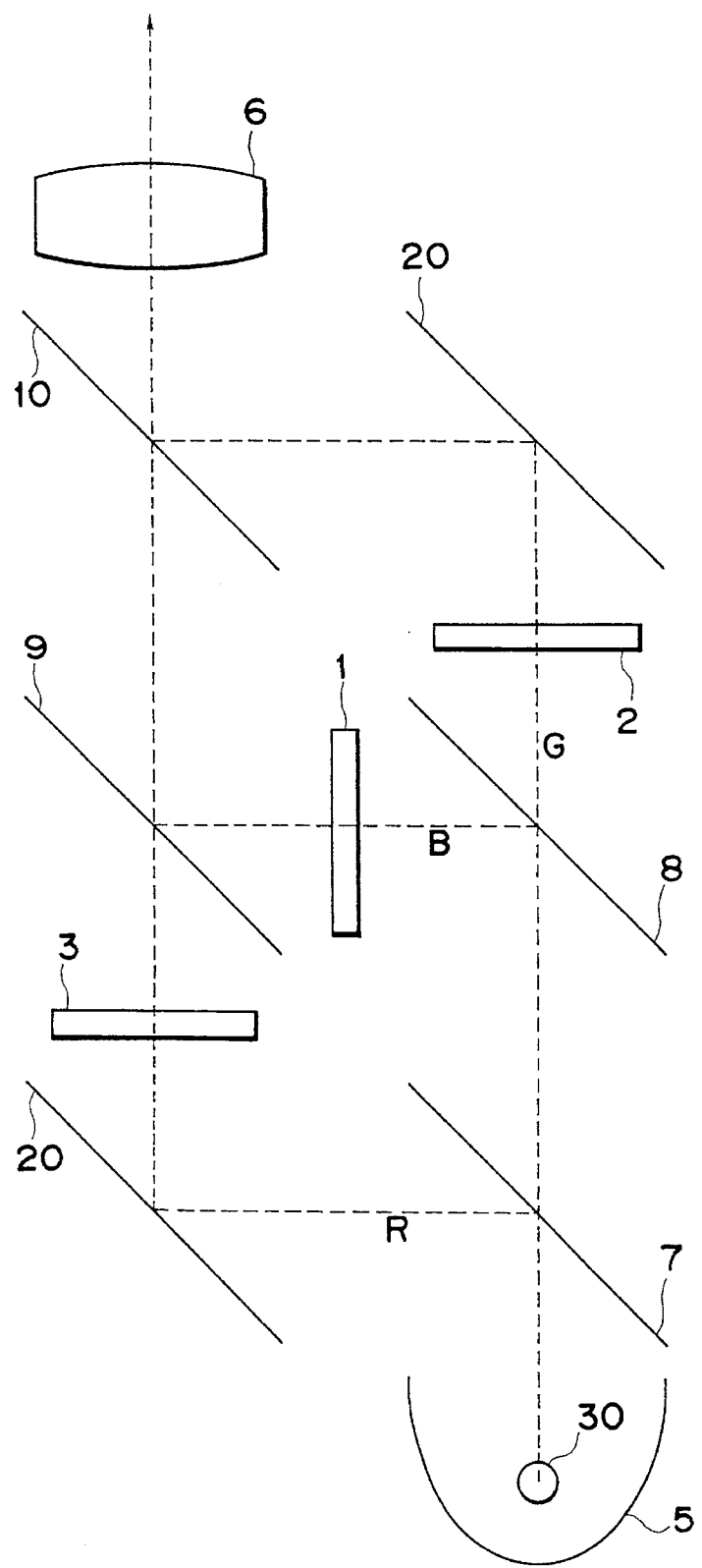
FIG. 1 is a schematic view showing an arrangement of a conventional projector.
Figure 2:
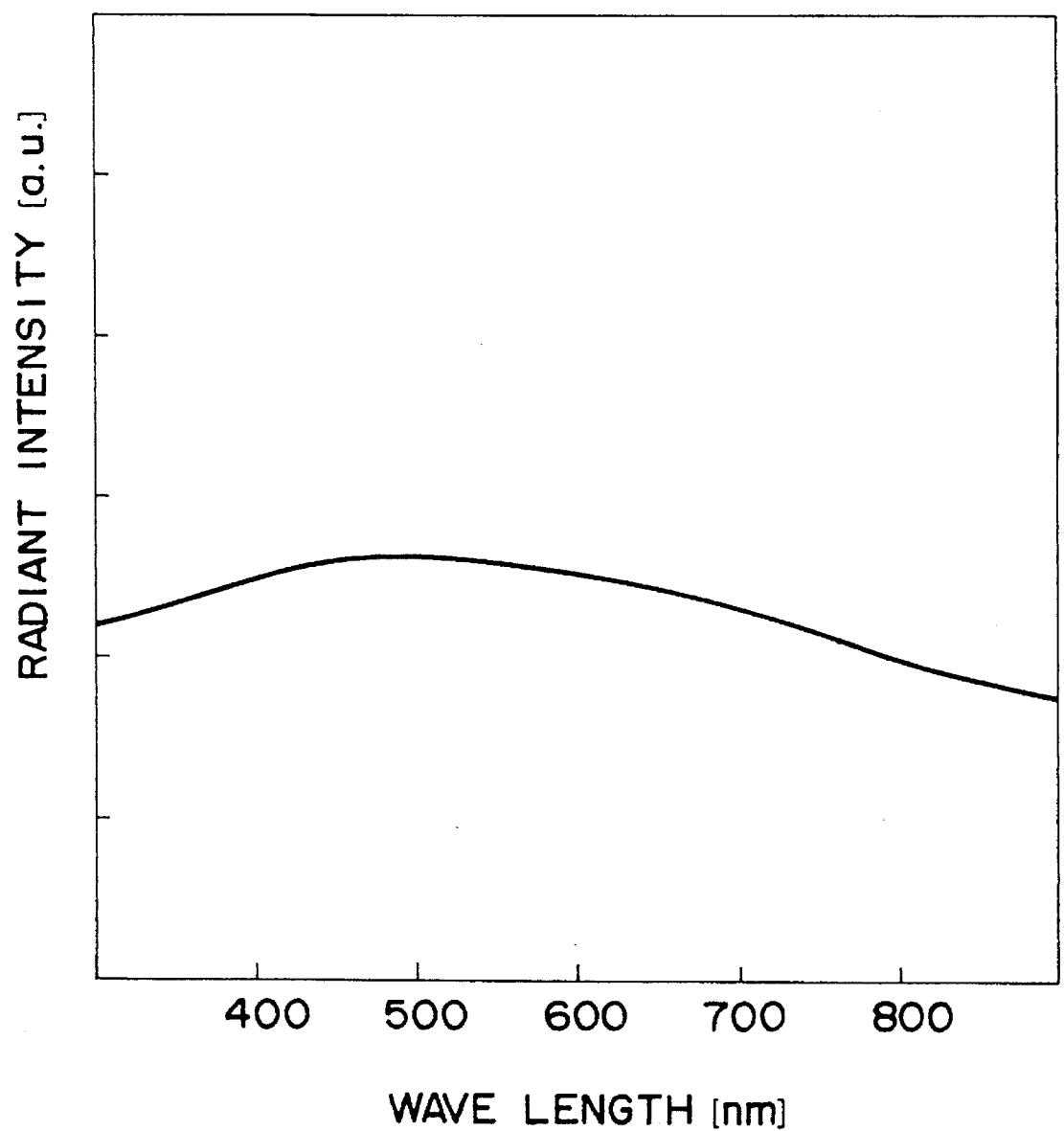
FIG. 2 is a graph showing the spectral characteristics of a white light source used in the conventional projector.

The white light source 30 of the conventional projector shown in FIG. 1 often comprises a metal halide lamp. Light emitted from a metal halide lamp generally has a shortage of the blue light component. In addition, when light passes through or reflected by a dichroic mirror, some light components having a wavelength of 400 nm or less are absorbed by the dichroic mirror.

When the above factors are taken into consideration, a light source for generating a blue light component which tends to be short is independently prepared, and a light source for emitting the remaining yellow light component (i.e., the green and red light components) is prepared to obtain an excellent color balance, as in the embodiments of FIGS. 3 and 4. Alternatively, the length of the optical path between the light source 31 for emitting the blue light component and the liquid crystal light valve 1 may be intentionally increased to obtain a length equal to that between the light source 32 for emitting the yellow light component and the liquid crystal light valves 2 and 3. This arrangement much facilitates white balance control.

Figure 6:
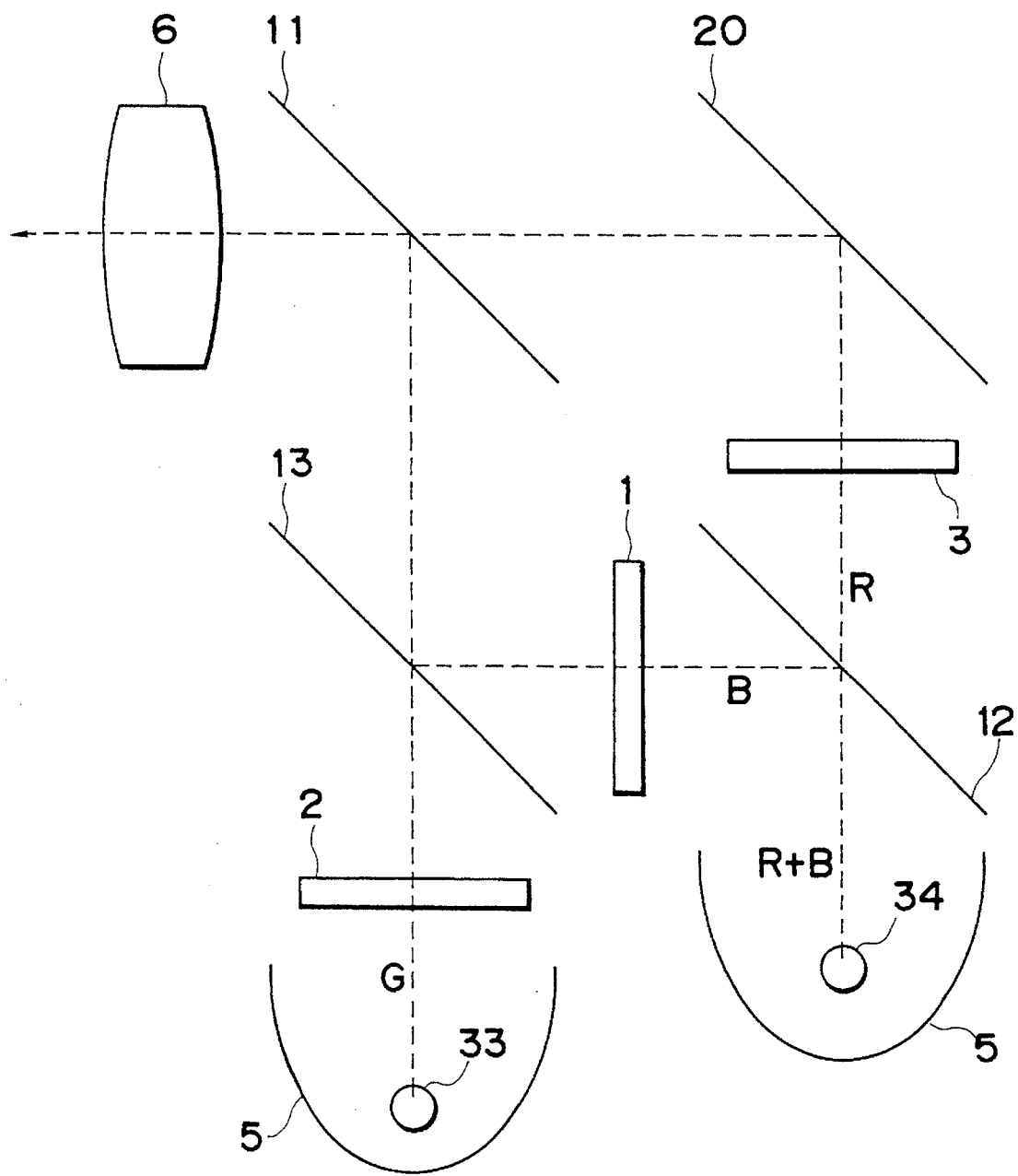
FIG. 6 is a schematic view showing an arrangement of still another embodiment of the present invention.

FIG. 6 is a schematic view showing still another embodiment of the present invention. Light valves 1, 2, and 3 as imaging means form color images corresponding to the blue, green, and red light components, respectively. An apparatus in FIG. 6 also includes a projection lens 6, dichroic mirrors 11, 12, and 13, a total reflection mirror 20, and color light sources 33 and 34 having spectral characteristics for emitting a green color component and red and blue light components, respectively. These components of the apparatus have a layout, as shown in FIG. 6.

The green light source 33 is located immediately behind the liquid crystal light valve 2. Illumination light emitted from the color light source 34 is color-separated into red and blue light components by the dichroic mirror 12. The red and blue light components are radiated on the liquid crystal light valves 3 and 1, respectively. As in the previous embodiments described above, the loss of the divergent illumination light can be greatly reduced, and a brighter image forming apparatus can be arranged.

The respective light components pass through the liquid crystal light valves 1, 2, and 3 and are synthesized again through the total reflection mirror 20, the dichroic mirror 13 for reflecting the blue light component and transmitting the green light component, and the dichroic mirror for transmitting the red light component and reflecting the blue light component. The synthesized light is projected through the projection lens 6.

In this embodiment, if the dichroic mirrors 11 and 12 are designed to transmit the red light component and reflect the blue and green light components, the dichroic mirrors 11 and 12 can be identical to each other, thus resulting in an economical advantage. At this time, if the dichroic mirrors 11 and 12 are constituted by a single dichroic mirror, the number of optical elements and the number of positioning operations can be reduced.

Light passing through a dichroic mirror generally has a larger light amount loss than light reflected thereby. In this embodiment, the blue light component does not pass through a dichroic mirror, the loss of the blue light component can be minimized.

Alternatively, the length of the optical path between the light source 33 for emitting the green light component and the liquid crystal light valve 2 may be intentionally increased to obtain a length equal to that between the light source 34 for emitting the red and blue light components and the liquid crystal light valves 1 and 3. This arrangement much facilitates white balance control. If the dichroic mirror 11 is replaced with the dichroic mirror 10 for reflecting the red light component and transmitting the green and blue light components, the projection direction can be shifted by 90° as in the embodiment shown in FIG. 4.

Figure 7:
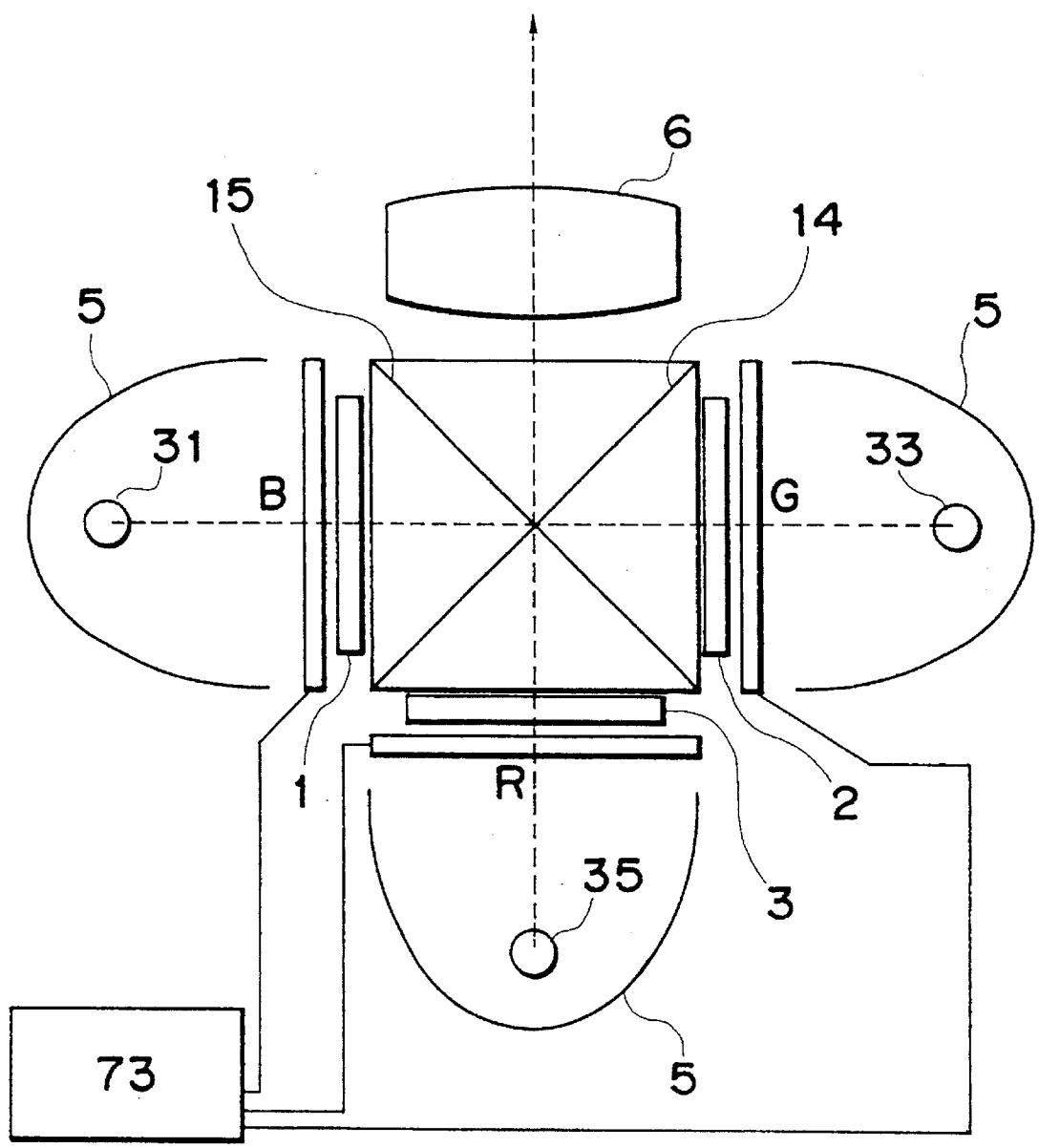
FIG. 7 is a schematic view showing an arrangement of still another embodiment of the present invention.

FIG. 7 is a schematic view showing still another embodiment of the present invention. Liquid crystal light valves 1, 2, and 3 as imaging means form color images corresponding to the blue, green, and red light components. An apparatus in FIG. 7 also includes a projection lens 6, dichroic films 14 and 15 formed at the interfaces of prisms, and color light sources 31, 33, and 35 having spectral characteristics for generating the blue, green, and red color components, respectively. These components have a layout, as shown in FIG. 7.

The blue light source 31 is located immediately behind the liquid crystal light valve 1, so that the length of the illumination optical path is ¼ or less that of the conventional example in FIG. 1. This also applies to the green and red light sources 33 and 35.

After the respective light components pass through the liquid crystal light valves 1, 2, and 3, they are synthesized again through the dichroic film 14 for reflecting only the blue light component and the dichroic film 15 for reflecting only the green light component. The synthesized light is projected through the projection lens 6.

When ease in design of the dichroic films is to be preferentially considered, a combination of a dichroic film for reflecting only the blue light component and a dichroic film for reflecting only the red light component is more preferable.

In this embodiment, the imaging means corresponding to the R, G, and B light components are illuminated with the R, G, and B light sources, respectively, so that an image forming apparatus having a very high luminance can be realized. As in the conventional example, when a color filter is attached to a white light source, the light amount is greatly reduced. In this embodiment and each embodiment described above, since light sources for emitting appropriate color light components are used, light utilization efficiency can be greatly improved.

In this embodiment, the dichroic prism is used as a color synthesis optical system. However, a crossed dichroic mirror as a combination of the dichroic mirrors described above may be used.

The color light sources described in each embodiment may have spectra matching desired conditions. In this case, a light source having a line spectrum is better than a light source having a wide emission spectrum because the width of chromaticity increases. As it is difficult to prepare a light source for a pure red light component at present, a combination of a light source having a larger amount of red light component than other components and a red filter for increasing purity of the red light component can be used. In this case, although the amount of red light component is slightly reduced by the filter, this combination is far better than the conventional arrangement obtained by attaching a color filter to a white light source when the total light efficiency including the blue and green light components is considered. Color filters may be used for color light sources except for the red light source to increase the color purities of other light components. Since these filters are used to increase the color purities, light amount losses are small. Note that as color light source materials in a metal halide lamp, sodium (Na-), indium (In-), and thallium (Tl-fased) gases are mixed for red, blue, and green, respectively, in addition to mercury.

In each embodiment described above, use of a plurality of light sources may cause unbalance in light amounts between the plurality of light sources with a lapse of time. An error occurs in white balance accordingly. A light amount adjusting means 73 as a means for correcting the white balance error may be arranged in each embodiment described above. Part of the synthesized light is directly received as white balance information or part of light reflected by a screen (not shown) upon incidence of the synthesized light is received as the white balance information while each liquid crystal light valve is set in a light-transmitting state. The white balance information is input to the illustrated light amount adjusting means 73. The light amount adjusting means 73 adjusts the light amount of at least one light source on the basis of the white balance information. For example, in the embodiment shown in FIG. 3, the liquid crystal light valve serves as both the image forming means and the light amount adjusting means. In the embodiment shown in FIG. 7, an ND filter is movably arranged to be inserted in an optical path as needed so as to perform light amount adjustment.

Figure 8:
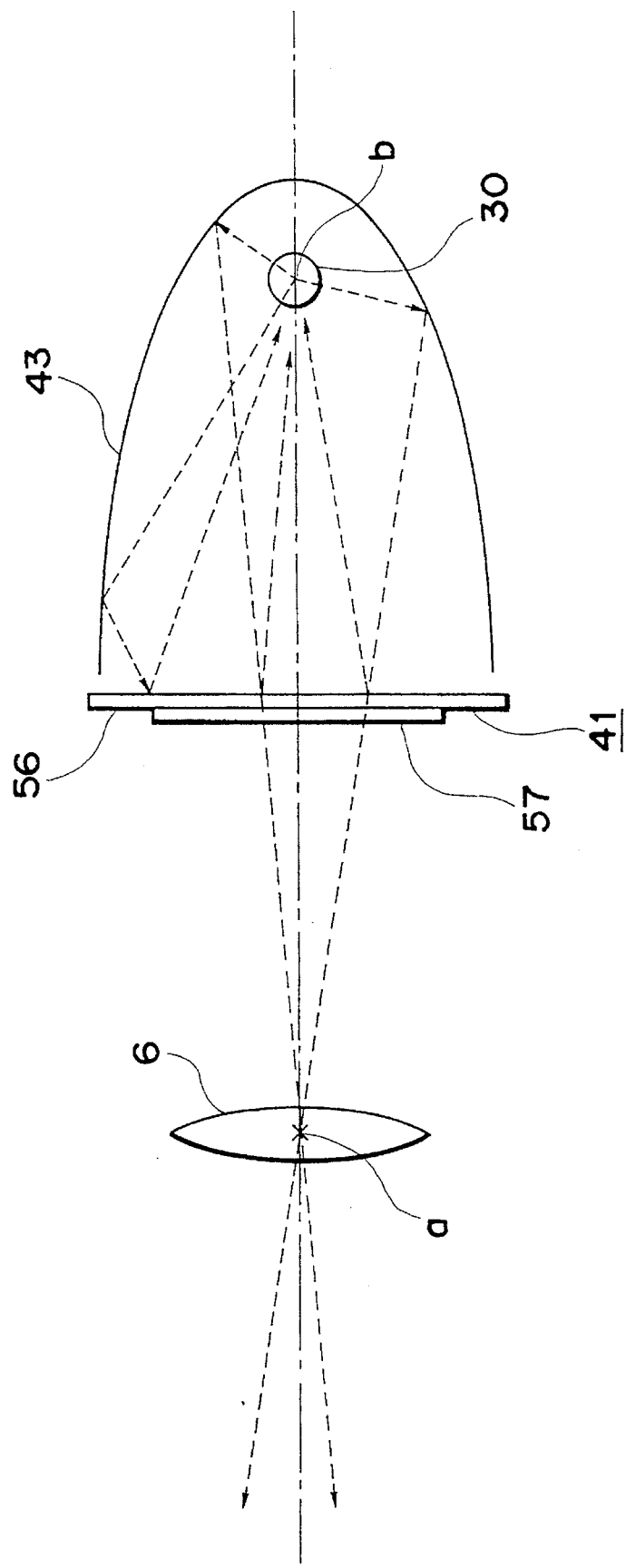
FIG. 8 is a schematic view showing an arrangement of still another embodiment of the present invention.

FIG. 8 shows still another embodiment of the present invention exemplifying its optical system. A reflector 43 comprises a cold mirror having a shape of a rotating ellipsoid. This ellipsoid has points a and b as focal points thereof. A light source 30 is located at the focal point b, and the pupil of a projection lens 6 is located at the focal point a. A liquid crystal light valve 41 is located at the middle position between the focal points a and b and is conjugate to a screen (not shown) through the projection lens 6. For this reason, as indicated by broken lines, light rays from the light source 30 and the reflector 43 are focused at an aperture of the projection lens 6 after the light rays pass through the liquid crystal light valve 41. A so-called Köhler illumination system is formed without using any condenser lens.

Figure 9:
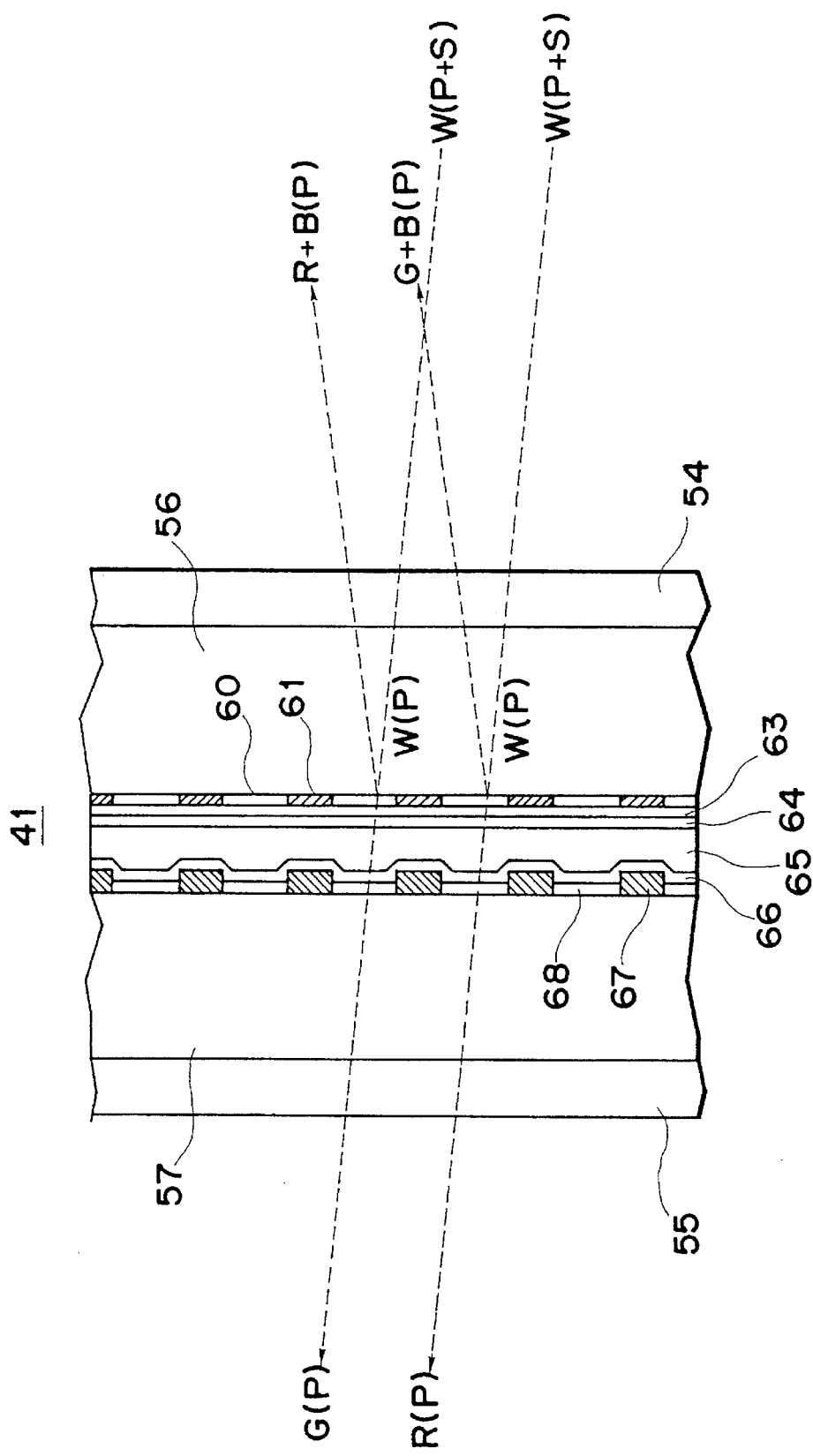
FIG. 9 is an enlarged sectional view of a liquid crystal light valve according to still another embodiment of the present invention.

FIG. 9 is an enlarged sectional view of the liquid crystal light valve 41. A liquid crystal layer 65 is sandwiched between a TFT substrate 57 having TFTs, wiring lines 67, and transparent pixel electrodes 68, and a counter substrate 56 having an interference color filter 60 having R, G, and B phosphors in a mosaic shape, a total reflection film 61, and a transparent counterelectrode 63. Polarizing plates 54 and 55 are adhered to the outer surfaces of the substrates 56 and 57 in a parallel-Nicols state. In this case, a normally black mode is set. The interference color filter 60 is arranged in correspondence with the effective display area of each pixel, and the total reflection film 61 is formed in correspondence with a non-effective display area of each TFT and wiring line. The characteristic feature of this liquid crystal valve lies in a multilayered interference type color filter as the color filter. These layers of the multilayered film can be formed by photolithography such as multilayered film deposition or ion beam etching.

White illumination light W(P+S) as nonpolarized light from the light source and the reflector is converted into a white linearly polarized light component W(P) through the polarizing plate 54 and is converted into monochrome linearly polarized light components such as G(P) and R(P) by the interference color filter 60. These light components are incident on the liquid crystal pixels. On the other hand, the linearly polarized light components such as R+B(P) and G+B(P) reflected by the interference color filter return to the light source 30, as indicated by the broken lines in FIG. 8 because the liquid crystal light valve 41 is located at the middle position between the focal points a and b of the ellipsoid. Light returning to the light source 30 is directed again toward the light crystal light valve 41.

Figure 10:
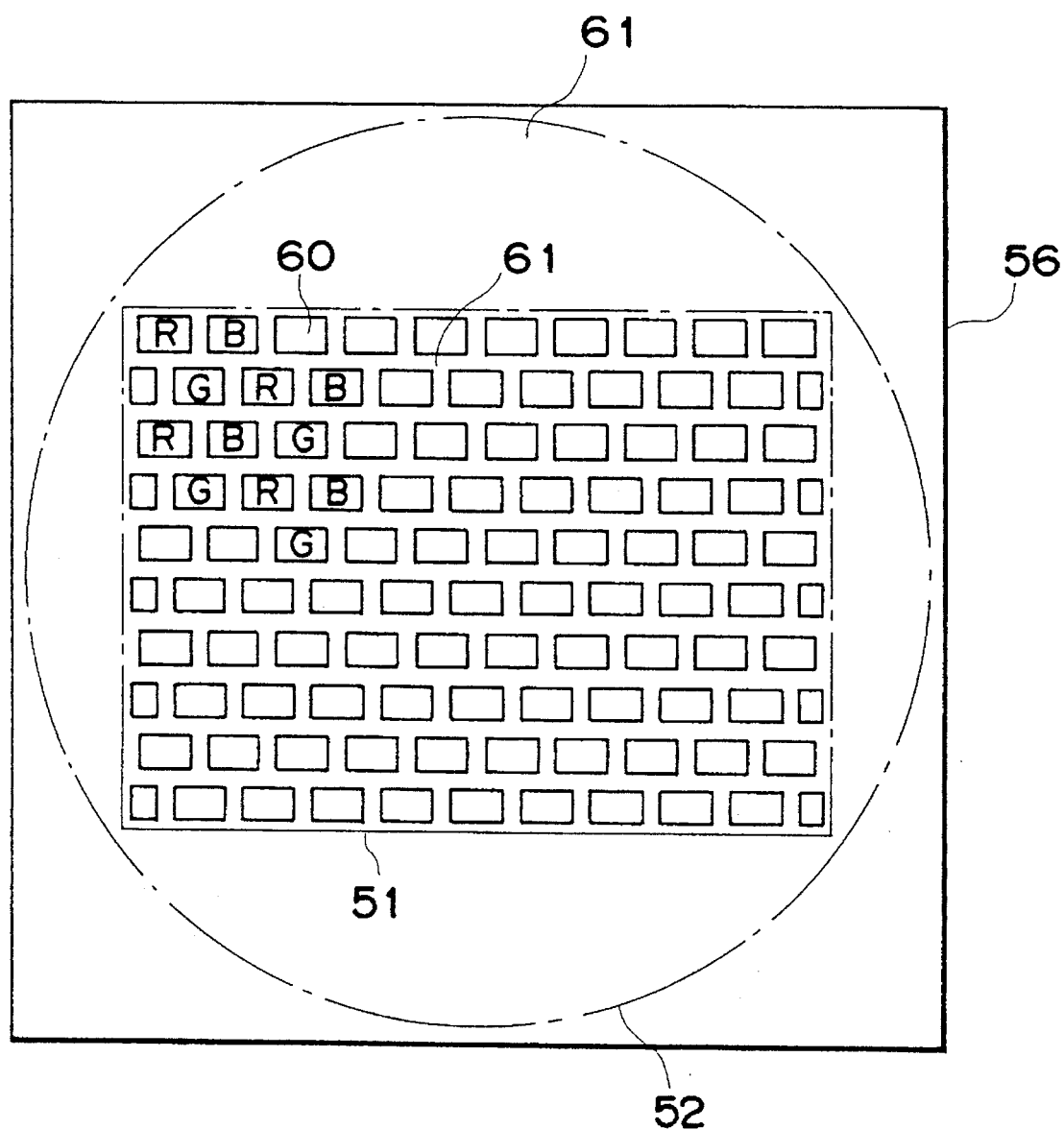
FIG. 10 is a view showing an arrangement of a color filter according to still another embodiment of the present invention.

FIG. 10 is a plan view showing the liquid crystal light valve 41 when viewed from the light source. The interference color filter 60 having R, G, and B components corresponding to the pixels is formed in a display area 51 in a mosaic shape. The non-effective display area between the pixels except for the display area is covered with the total reflection film 61 formed on the transparent counter substrate 56. A circle 52 indicated by the alternate long and short dashed line in FIG. 10 represents an illumination area by the reflector 43 and the light source 30. Of illumination light which illuminates the illumination area 52, illumination light components reaching the non-display area are reflected by the total reflection film 61. This reflected light returns to the light source 30 together with the light reflected by the interference color filter 60, as indicated by the broken lines in FIG. 8. The return light is then directed again toward the liquid crystal light valve 41.

According to this embodiment, since the non-effective light which is absorbed and disappears in the absorption type color filter and a light-shielding mask can return to the light source, this light can be utilized as illumination light again. That is, a return/reutilization loop is formed, and the light utilization efficiency of the illumination light can be greatly improved. Therefore, a brighter image forming apparatus can be realized. In addition, a Köhler illumination system can be formed in front of the liquid crystal light valve (i.e., on the light source side) without using any condenser lens.

In this embodiment, the reflector has a shape of an ellipsoid, but a hyperbolic reflector can be used to obtain the same effect as described above.

Figure 11:
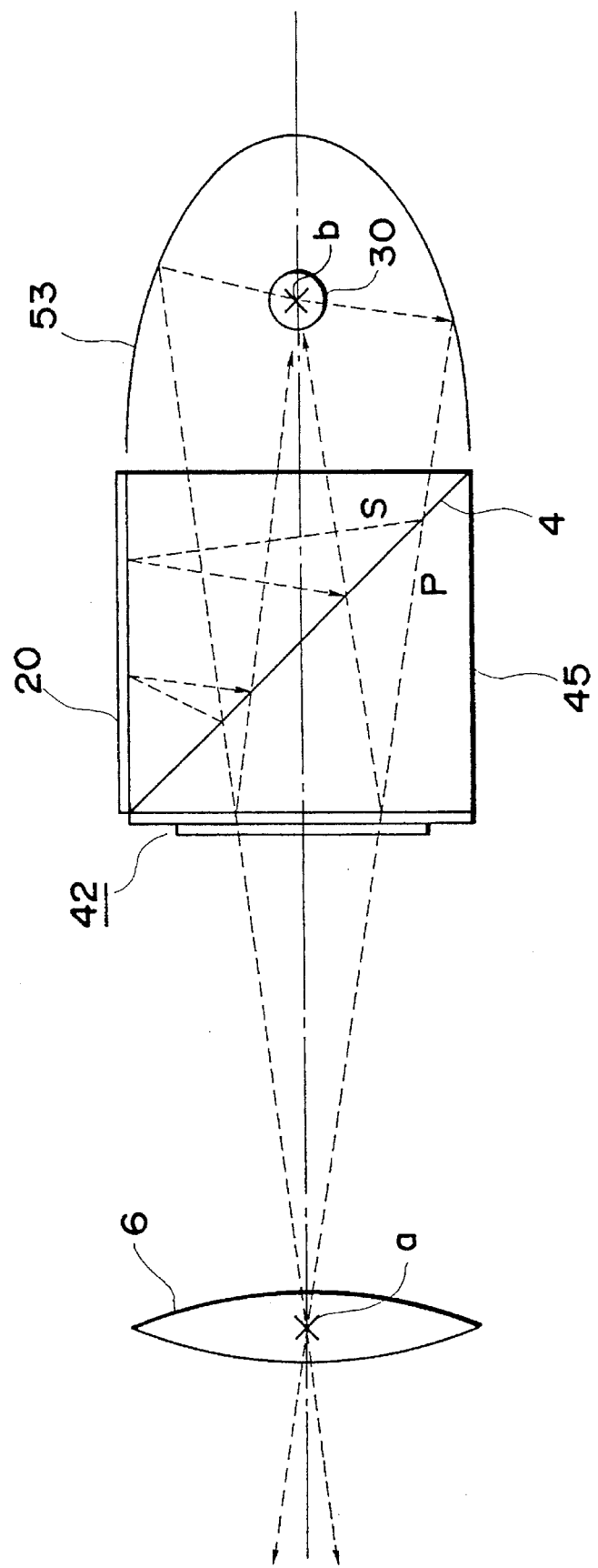
FIG. 11 is a schematic view showing an arrangement of still another embodiment of the present invention.

FIG. 11 shows still another embodiment exemplifying its optical system. A reflector 53 comprises a cold mirror having a shape of a rotating ellipsoid. This ellipsoid has points a and b as its focal points as in the above embodiment. A light source 30 is located at the focal point b, and the pupil of a projection lens 6 is located at the focal point a. A liquid crystal light valve 42 is located at the middle position between the focal points a and b.

A polarizing beam splitter 45 adhered with a total reflection mirror 20 is located between the liquid crystal light valve 42 and the reflector 53 to constitute a return type polarizing conversion system. Illumination light (non-polarized light) emitted from the light source 30 through the reflector 53 is split by a polarizing beam splitter surface 4 into a p-polarized light component having a polarization plane parallel to the drawing surface and an s-polarized light component having a polarization plane perpendicular to the drawing surface.

The p-polarized light component passes through the polarizing beam splitter surface 4 and illuminates the liquid crystal light valve 42. The s-polarized light component is reflected by the polarizing beam splitter surface 4, reflected again by the total reflection mirror 20, and is reflected by the polarizing beam splitter surface 4. This reflected light returns to the light source 30 because the position of the mirror surface 20 is located at a position equivalent to the middle position between the focal points a and b. In the process in which the reflector 53 reflects the s-polarized light component using the light source 30 as a secondary source, the s-polarized light component is scattered by the bulb portion of the light source 30 or reflected by the reflector 53 to disturb the polarization plane. The light having the disturbed polarization plane is split again by the polarizing beam splitter surface 4 into p- and s-polarized light components. By repeating this process, almost all the light emitted from the light source 30 are polarized into the p-polarized components which are then incident on the liquid crystal light valve 42. The liquid crystal light valve 42 has a mode for polarizing the p-polarized light component. However, when the mode is selected such that the liquid crystal light valve 42 modulates the s-polarized light component, the positions of the liquid crystal light valve 42 and the total reflection mirror 20 need only be reversed.

The illumination light is focused at the aperture of the projection lens 6 by the focusing effect of the elliptical reflector 53 upon transmission through the liquid crystal light valve, as in the embodiment described above. A so-called Köhler illumination system can be formed without using any condenser lens. The liquid crystal light valve 42 has the same basic arrangement as that of the liquid crystal light valve 41 shown in FIG. 9 except for the incident-side polarizing plate 54. Light reflected by an interference color film 60 and the total reflection mirror 61 passes through a polarizing beam splitter 45 and returns to the light source 30 as in the above embodiment. In addition to the return/reutilization effect of the non-effective light reflected by the liquid crystal light valve 42 as in the above embodiment, illumination light is polarized and converted, thereby further improving the light utilization efficiency, and a brighter image forming apparatus can be realized.

An incident-side polarizing plate 54 as in the above embodiment can be arranged to increase the polarization ratio in this embodiment.

As a polarizing beam splitter, a plurality of parallel flat plates such as glass plates may be used overlapping each other in place of the prism type beam splitter. In this case, light is caused to become incident at a Brewster angle to split it into s- and p-polarized light components. This embodiment can realize a lighter apparatus.

Figure 12:
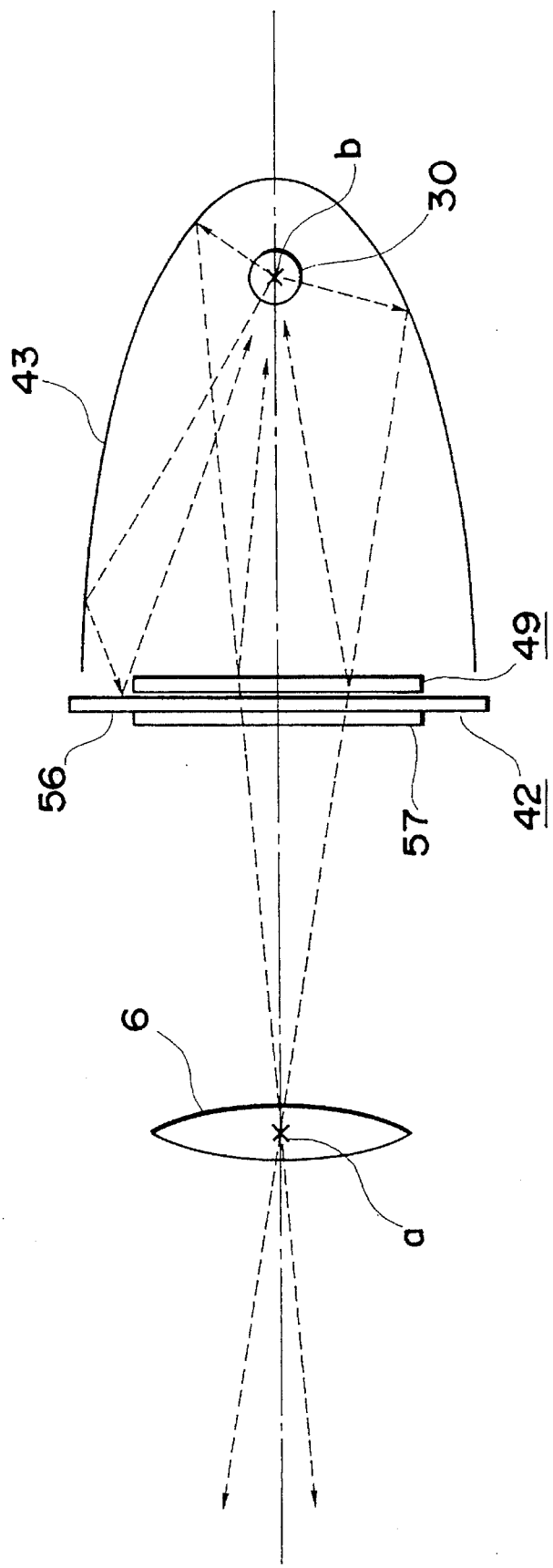
FIG. 12 is a schematic view showing an arrangement of still another embodiment of the present invention.
Figure 13:
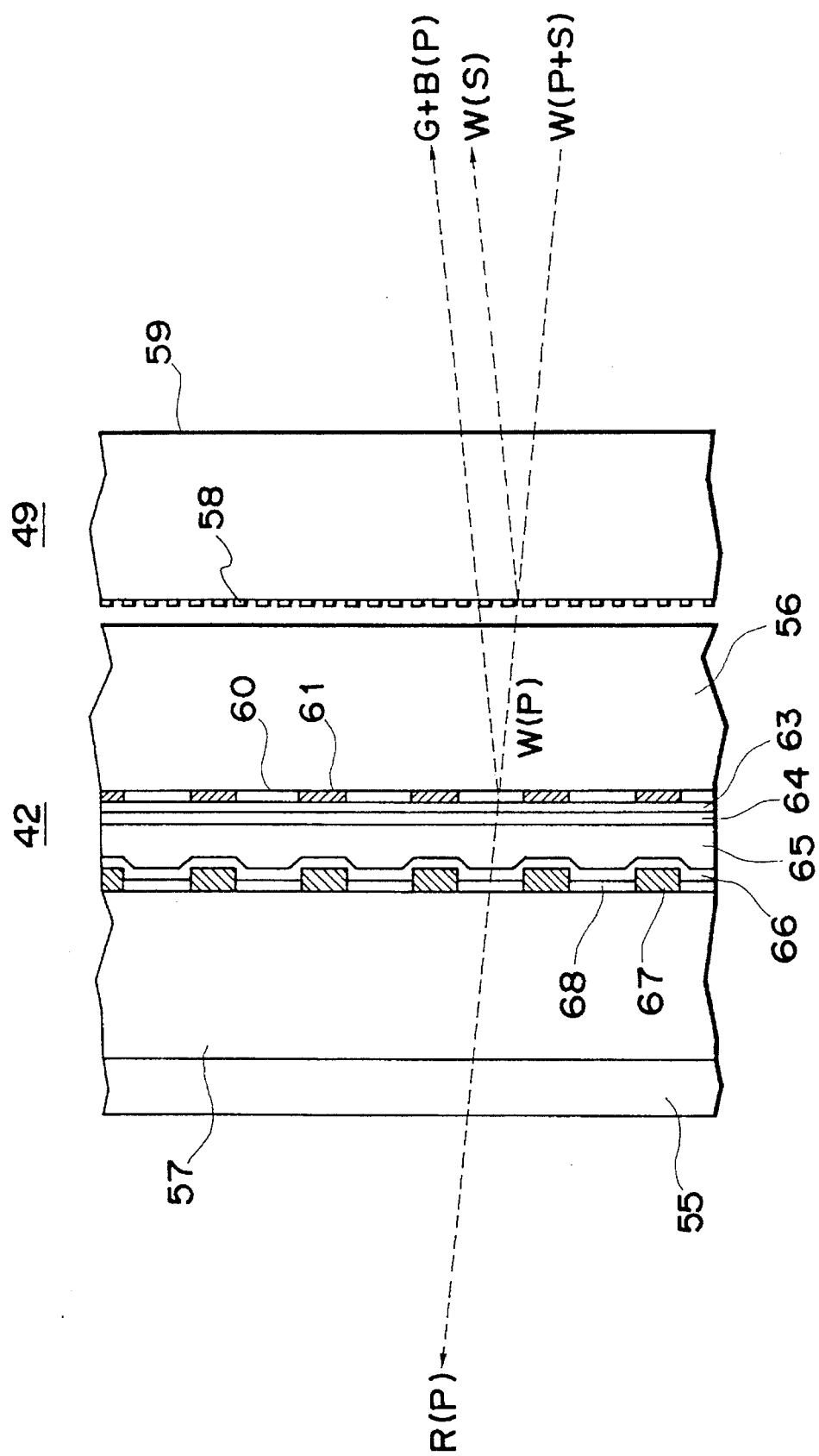
FIG. 13 is an enlarged sectional view of a liquid crystal light valve according to still another embodiment of the present invention.

FIG. 12 is a view showing an optical system according to still another embodiment. The embodiment in FIG. 12 is different from that of FIG. 8 in that a grid polarizing plate 49 is located on the light source side of a liquid crystal light valve. FIG. 13 is an enlarged sectional view of this liquid crystal light valve 42 and the grid polarizing plate 49.

The grid polarizing plate 49 is obtained by forming a metal grid (lattice) 58 on the surface of a transparent grid substrate 59 of quartz, glass, or the like. The pitch of the grid lines is preferably 50 nm or less. This grid can be formed by X-ray lithography or ion beam drawing. The grid polarizing plate is described in detail in Appl. Optics 6 (1967), 1023 or the like.

The operation of this embodiment will be described below. White illumination light W(P+S) as non-polarized light from the light source and the reflector is split into s- and p-polarized light components by a grid 58. More specifically, an s-polarized light component W(S) is reflected, and a p-polarized light component W(P) passes to illuminate the liquid crystal light valve 42. Since the grid 58 is located at the middle position between the focal points a and b of the elliptical reflector 43, the reflected s-polarized light component W(S) returns to a portion near the light source 30. Of the transmitted p-polarized light component W(P), a non-effective light component reflected by the interference color filter 60 and the total reflection film 61 also returns to a portion near the light source 30 because the reflection position is near the grid 58. As in the above embodiment, the s-polarized light component returning to the light source 30 has a disturbed polarization plane, and part of it serves as illumination light for the liquid crystal light valve 42. The non-effective light components reflected by the interference color filter 60 and the total reflection film 61 are also utilized as illumination light for the liquid crystal light valve 42 through the light source 30 and the reflector 43.

As described above, according to this embodiment, a brighter image forming apparatus obtained by return/reutilization and polarization of the illumination light can be realized by a very simple arrangement shown in FIG. 12.

A hyperbolic reflector may be used in place of the elliptical reflector 43 in this embodiment. As previously described above, when the light returning to the light source is reflected by a reflector to preferentially disturb the polarization plane, the hyperbolic reflector is better than the elliptical reflector due to the following reason. As can be apparent from FIG. 11, when the elliptical reflector is used, return light is reflected by the reflector and emerges. However, when the hyperbolic reflector is used, light is reflected twice and emerges, so that the polarization plane is disturbed much.

When the reception angle of light emitted from the light source is taken into consideration, the elliptical reflector is advantageous over the hyperbolic reflector. Therefore, these two reflectors can be appropriately used in accordance with application purposes.

Figure 14:
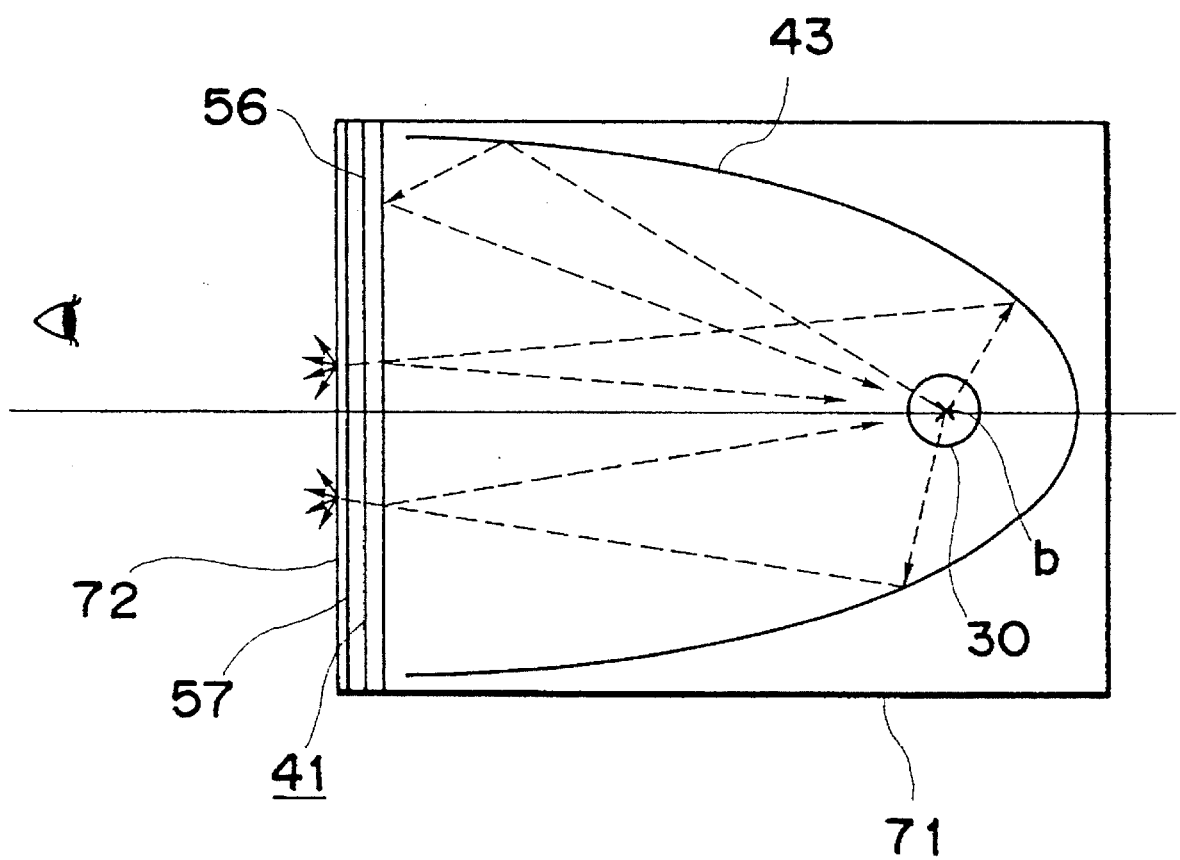
FIG. 14 is a schematic view showing still another embodiment of the present invention.

FIG. 14 shows still another embodiment which exemplifies a direct viewing type image forming apparatus without using a projection lens. The arrangement of this embodiment is substantially the same as that of FIG. 8 except for the projection lens 6, and a detailed description thereof will be omitted. The apparatus of the embodiment shown in FIG. 14 has a cabinet 71 and a diffusion plate 72 for increasing the field angle. The embodiments shown in FIGS. 3, 4, 6, 7, 11, and 12 can equally cope with direct viewing type apparatuses.

The present invention is not limited to the particular embodiments described above. Various changes and modifications may be made without departing from the spirit and scope of the invention.

For example, the imaging means is not limited to the liquid crystal light valve. Any optical element such as a PLZT or the like may be used if it can change the state of the polarized light to obtain information light.

The means for splitting light from the light source into the p- and s-polarized light components is not limited to the polarizing beam splitter. Any optical element such as a birefringent lens made of an optically uniaxial material, a Wollaston prism, a Glan-Thompson prism, and a cholesteric liquid crystal layer if it can split light into a pair of different polarized beam components.

The present invention is not limited to a projector or a direct viewing type display apparatus, but can be extended to a recording apparatus such as a liquid crystal printer.

According to an aspect of the present invention, there is provided an image forming apparatus having a plurality imaging means for forming color-separated images and color-synthesizing means for synthesizing the image light components from the plurality of imaging means, characterized by comprising a plurality of light sources, wherein the plurality of imaging means are illuminated with different color light components.

According to another aspect of the present invention, there is provided a projector comprising an elliptical reflector and a light source located near one focal point of the elliptical reflector and a projection lens located such that a pupil thereof is located near the other focal point of the elliptical reflector, wherein imaging means is located at a position equidistantly spaced apart from both the focal points, so that non-image light reflected by the imaging means is directed near the light source.

According to still another aspect of the present invention, there is provided a projector having a reflector of a shape having at least one focal point, a light source arranged near the focal point, imaging means for modulating light from the light source to form an image, and a mosaic color filter for color-separating the light incident on the imaging means into red, green, and blue light components in a mosaic distribution, wherein the mosaic color filer comprises an interference filter for transmitting any of the red, green, and blue light components and reflecting remaining color components, and the reflected remaining light components are directed near the light source. In this manner, an image forming apparatus and a projector, in which color balance is excellent, and light utilization efficiency and resolving power are high, are obtained.

What is claimed is:

1. A projector comprising:

a reflector having a substantially elliptical shape;

a light source arranged near one focal point of said reflector;

information forming means for modulating light from said light source to form information; and a projection lens for projecting information light formed by said information forming means, said projection lens being arranged such that a pupil of said projection lens is located near the other focal point of said reflector, wherein said information forming means is located at a position substantially equidistantly from the two focal points, so that non-image light reflected by said information forming means of the light emitted from said light source is directed toward a portion near said light source.

2. A projector according to claim 1, further comprising an interference-type mosaic filter, at a light source side of said information forming means, for transmitting a predetermined color component and reflecting remaining color components so as to focus the light from said light source in a mosaic pattern of red, green, an blue, thereby directing the reflected remaining color component near said light source.

3. A projector according to claim 1, wherein said information forming means comprises a liquid crystal light valve, and wherein a reflecting surface is formed within a fight transmitting portion of said fight valve on a light source side of said light valve, thereby directing light reflected by said reflecting surface near said light source.

4. A projector according to claim 1, further comprising polarizing converting means, formed between said light source and said information forming means, for splitting the light from said light source into a pair of polarized light components having mutually different polarization states, directing one polarized light component toward said information forming means, and returning the other polarized light component near said light source, so that at least part of said other polarized light component is converted to have a polarization state coinciding with that of said one polarized light component through said light source and said reflector.

5. A projector according to claim 4, wherein said polarizing converting means includes a grid polarizer.

6. A projector according to claim 4, wherein said polarizing converting means comprises a polarizing beam splitter and a reflecting member for reflecting said other polarized light component, and said reflecting member returns said other polarized light component near said light source through said polarizing beam splitter and is located at a position equivalent to a position substantially equidistantly spaced apart from the two focal points.

7. A light modulating apparatus comprising:

a light source;

an elliptic mirror for reflecting light from said light source, wherein said elliptic mirror has a first focal point and a second focal point in order from a side of said elliptic mirror; and light modulating means for receiving and modulating said light reflected by said elliptic mirror, wherein said light modulating means are disposed at a substantially intermediate position between said first focal point and said second focal point such that a portion of said light is reflected to be directed to said light source.

8. A light modulating apparatus according to claim 7, wherein said light modulating apparatus is constructed so as to modulate a polarized component and a polarizing device for taking said polarized component from said light reflected by said elliptic mirror is disposed at a side of said light source in said light modulating means.

9. A light modulating apparatus according to claim 8, wherein said polarizing device includes a grid polarizing element.

10. A light modulating apparatus according to claim 8, wherein said polarizing device includes a polarization beam splitter and a plane mirror for directing a polarized component normal to said polarized component from said polarization beam splitter to said light source.

11. A light modulating apparatus according to claim 10, wherein a distance between said polarization beam splitter and said plane mirror is substantially equal to a distance between said polarization beam splitter and said light modulating means.

12. A light modulating apparatus according to claim 7, wherein an interference filter for taking light of a color from said light reflected by said elliptical mirror is formed in said light modulating means.

13. A light modulating apparatus according to claim 7, wherein a reflecting film is formed in an area where said interference filter in said light modulating means is not formed.

14. A light modulating apparatus according to claim 7, wherein a reflecting film for reflecting said portion of said light is formed in said light modulating means.

15. A light modulating apparatus according to claim 7, wherein said modulating means includes image forming means having a number of pixels.

16. A light modulating apparatus according to claim 15, further comprising a projecting optical system for projecting an image which said image forming means form.

17. A light modulating apparatus according to claim 15, wherein an interference filter for taking light of a color from said light reflected by said elliptical mirror is formed in said light modulating means.

18. A light modulating apparatus according to claim 17, wherein a reflecting film is formed in an area where said interference filter in said light modulating means is not formed.

19. A light modulating apparatus according to claim 15, wherein a reflecting film for reflecting said portion of said light is formed in said fight modulating means.

20. A light modulating apparatus according to claim 15, wherein said light modulating apparatus is constructed so as to modulate a polarized component and a polarizing device for taking said polarized component from said light reflected by said elliptic mirror is disposed at a side of said light source in said light modulating means.

21. A light modulating apparatus according to claim 20, wherein said polarizing device includes a grid polarizing element.

22. A light modulating apparatus according to claim 20, wherein said polarizing device includes a polarization beam splitter and a plane mirror for directing a polarized component normal to said polarized component from said polarization beam splitter to said fight source.

23. A light modulating apparatus according to claim 22, wherein a distance between said polarization beam splitter and said plane mirror is substantially equal to a distance between said polarization beam splitter and said light modulating means.

24. A light modulating apparatus according to claim 16, wherein a position of pupil of said projecting optical system is substantially equal to a position of said second focal point.

25. An image forming apparatus comprising:

first, second, and third imaging means for forming images in red, green and blue, respectively;

color synthesizing means for synthesizing image light components from said first, second, and third imaging means;

at least two light sources for illuminating said first, second, and third imaging means, respectively;

wherein said at least two light sources are color light sources for emitting color light mainly containing color components of said images formed by said first, second, and third imaging means, respectively; and light amount adjusting means for adjusting the light amount of at least one of the color light sources to adjust a whim balance.

* * * * *

UNITED STATES PATENT AND TRADEMARK OFFICE
CERTIFICATE OF CORRECTION

PATENT NO. : 5,580,142
DATED : December 3, 1996
INVENTOR(S) : Kurematsu et al.

It is certified that error appears in the above-indentified patent and that said Letters Patent is hereby corrected as shown below:

Column 11,

Claim 3, line 3, delete "fight" and insert therefor -- light --
Column 12,
Claim 25, line 15, delete "whim" and insert therefor -- white --

Signed and Sealed this

Fourth Day of March, 1997

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,580,142
DATED : December 3, 1996
INVENTOR(S) : Katsumi Kurematsu et al.

It is certified that error appears in the above-indentified patent and that said Letters Patent is hereby corrected as shown below:

On the title page:

[21] Appl. No. please delete "454,411" and insert therefor -- 454,441 --.

Signed and Sealed this

Twenty-sixth Day of October, 1999

Attest:

Q. TODD DICKINSON

Attesting Officer

Acting Commissioner of Patents and Trademarks